United States Patent
Chang et al.

(10) Patent No.: US 11,572,280 B2
(45) Date of Patent: Feb. 7, 2023

(54) ENVIRONMENTALLY BENIGN PRODUCTION OF GRAPHENE SUSPENSIONS

(71) Applicant: Nanotek Instruments, Inc., Dayton, OH (US)

(72) Inventors: Hao-Hsun Chang, Centerville, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/053,239

(22) Filed: Aug. 2, 2018

(65) Prior Publication Data

US 2020/0039828 A1    Feb. 6, 2020

(51) Int. Cl.
*C01B 32/19*        (2017.01)
*C01B 32/194*       (2017.01)
(Continued)

(52) U.S. Cl.
CPC ............ *C01B 32/19* (2017.08); *C01B 32/194* (2017.08); *C01B 32/198* (2017.08); *B82Y 30/00* (2013.01); *B82Y 40/00* (2013.01); *C01B 2204/02* (2013.01)

(58) Field of Classification Search
None
See application file for complete search history.

(56) References Cited

U.S. PATENT DOCUMENTS 7,071,258 B1    7/2006  Jang et al.
9,481,576 B2 *  11/2016 Zhamu ................ C01B 31/0469
(Continued)

FOREIGN PATENT DOCUMENTS

CN    101671015 B  *  7/2011
CN    203128206 U  *  8/2013
(Continued)

OTHER PUBLICATIONS

Abstract of CN 101671015 B, 2011 (Year: 2011).*
(Continued)

*Primary Examiner* — Nicole M. Buie-Hatcher

(57) ABSTRACT

A method of producing a graphene suspension, comprising: (a) mixing multiple particles of a graphitic material and multiple particles of a solid carrier material to form a mixture in an impacting chamber of an energy impacting apparatus; (b) operating the energy impacting apparatus with a frequency and an intensity for a length of time sufficient for peeling off graphene sheets from the graphitic material and transferring the graphene sheets to surfaces of the carrier material particles to produce graphene-coated carrier particles inside the impacting chamber; and (c) dispersing the graphene-coated carrier particles in a liquid medium and separating the graphene sheets from the carrier material particles using ultrasonication or mechanical shearing means and removing the carrier material from the liquid medium to produce the graphene suspension. The process is fast (1-4 hours as opposed to 5-120 hours of conventional processes), environmentally benign, cost effective, and highly scalable.

22 Claims, 5 Drawing Sheets

(51) Int. Cl.
*C01B 32/198* (2017.01)
*B82Y 40/00* (2011.01)
*B82Y 30/00* (2011.01)

(56) References Cited

U.S. PATENT DOCUMENTS

| | | | | |
|---|---|---|---|---|
| 2008/0279756 | A1* | 11/2008 | Zhamu | C01B 32/225 |
| | | | | 423/448 |
| 2014/0044968 | A1* | 2/2014 | Papakonstantinou | B82Y 30/00 |
| | | | | 977/734 |
| 2015/0158729 | A1* | 6/2015 | Wu | C01B 32/192 |
| | | | | 423/448 |
| 2015/0279506 | A1* | 10/2015 | Wolfrum | C09C 1/44 |
| | | | | 252/510 |
| 2016/0009561 | A1* | 1/2016 | Coleman | H01M 4/583 |
| | | | | 423/406 |
| 2017/0158513 | A1* | 6/2017 | Zhamu | C01B 32/194 |

FOREIGN PATENT DOCUMENTS

| | | | | |
|---|---|---|---|---|
| CN | 104556011 A | * | 4/2015 | |
| CN | 104709900 A | * | 6/2015 | ........... C01B 32/192 |
| CN | 102701193 B | * | 7/2015 | |
| CN | 107418206 A | * | 12/2017 | |
| EP | 2878709 A1 | * | 6/2015 | ............. C01B 32/19 |
| GB | 2544797 A | * | 5/2017 | ............. C01B 19/04 |

OTHER PUBLICATIONS

Machine translation of CN 102701193 B, retrieved Jan. 2020 (Year: 2020).*
Machine translation of CN 104556011A, retrieved Jan. 2020 (Year: 2020).*
Machine translation of CN 203128206 U, retrieved Apr. 2021 (Year: 2021).*
Machine translation of CN 107418206 A, retrieved Apr. 2021 (Year: 2021).*
Zhao, "Preparation of graphene by exfoliation of graphite using wet ball milling", J. Mater. Chem., 2010, 20, 5817-5819. (Year: 2010).*
Wu, "One-step in situ ball milling synthesis of polymer-functionalized graphene nanocomposites", J. Mater. Chem., 2011, 21, 8626. (Year: 2011).*
León, "Few-layer graphenes from ball-milling of graphite with melamine", Chem. Commun., 2011, 47, 10936-10938 (Year: 2011).*
Anderson et al., "The Use of Esters of N-Hydroxysuccinimide in Peptide Synthesis" J. Amer. Chem. Soc. (1964) vol. 86, No. 9, pp. 1839-1842.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.

* cited by examiner 500 nm ical suspensions consumes less energy (e.g., no need for a high-temperature thermal shock exposure step), is more environmentally benign (no need for acid, oxidizer, and huge amount of wash/rinse water), and can be more easily scaled up.

ENVIRONMENTALLY BENIGN PRODUCTION OF GRAPHENE SUSPENSIONS

FIELD OF THE INVENTION

The present invention relates to the art of graphene materials and, in particular, to an environmentally benign method of producing graphene suspensions containing isolated graphene or graphene oxide sheets dispersed in a liquid medium.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<50% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group was among the first to discover graphene [B. Z. Jang and W. C. Huang, "Nano-scaled Graphene Plates." U.S. patent application Ser. No. 10/274, 473, submitted on Oct. 21, 2002, now U.S. Pat. No. 7,071, 258 (Jul. 4, 2006)]. The processes for producing NGPs and NGP nanocomposites were reviewed by us [Bor Z. Jang and A Zhamu, "Processing of Nano Graphene Platelets (NGPs) and NGP Nanocomposites: A Review," J. Materials Sci 43 (2008) 5092-5101].

The primary approach to production of graphene oxide is based on the intercalation and oxidation of graphite, as illustrated in FIG. 1. This approach entails treating natural graphite powder with an intercalant and an oxidant (e.g., concentrated sulfuric acid and nitric acid, respectively) to obtain a graphite intercalation compound (GIC) or, actually, graphite oxide (GO) [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2} d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers. This is also a main reason why an excessively large amount of concentrated acid and oxidizer is required.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

Furthermore, the conventional process for producing a graphene suspension requires two separate procedures: graphene production and graphene dispersion in a liquid medium.

Hence, an urgent need exists to have an integrated graphene production/dispersion process to produce a graphene suspension that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$).

Our research has yielded a process for substantially chemical-free production of a suspension containing isolated graphene oxide dispersed in a liquid medium (e.g.

water, organic solvent, etc.). In addition, the process is of enhanced utility in that it is cost-effective, and provides graphene materials with significantly reduced environmental impact.

SUMMARY OF THE INVENTION

The present invention provides a strikingly simple, fast, scalable, environmentally benign, and cost-effective process that meets the aforementioned needs. This method of producing a graphene dispersion (comprising single-layer or few layer graphene sheets dispersed in a liquid medium) directly from a graphitic or carbonaceous material (a graphene source material) comprises subjecting a mixture of graphitic material, an optional oxidizing and/or functionalizing agent, particles of a solid carrier material, and, optionally, impacting balls to mechanical agitation via a ball mill or similar energy impacting device for a length of time sufficient for peeling off graphene layers (planes of hexagonally arranged carbon atoms) from the source graphite material, and coating these peeled-off graphene layers onto surfaces of the solid carrier material particles. With the presence of impacting balls, graphene sheets can be peeled off from the source graphite particles and tentatively deposited onto the surfaces of impacting balls. When these graphene sheet-coated impacting balls subsequently impinge upon solid carrier particles, the graphene sheets are transferred to surfaces of carrier particles. These steps are followed by dispersing the graphene-coated carrier particles in a liquid medium and separating the graphene sheets from the carrier material particles using ultrasonication or mechanical shearing means and removing the carrier material from the liquid medium to produce the graphene suspension.

Thus, in some embodiments, the invention provides a method of producing a graphene suspension directly from a graphitic material, the method comprising: (a) mixing multiple particles of a graphitic material, an optional oxidizing/functionalizing liquid, and multiple particles of a solid carrier material to form a mixture in an impacting chamber of an energy impacting apparatus; (b) operating the energy impacting apparatus with a frequency and an intensity for a length of time sufficient for peeling off graphene sheets from the graphitic material and transferring the graphene sheets to surfaces of the solid carrier material particles to produce graphene-coated solid carrier particles inside the impacting chamber; and (c) dispersing the graphene-coated solid carrier particles in a liquid medium and separating the graphene sheets from the carrier material particles using ultrasonication or mechanical shearing means and removing the carrier material from the liquid medium to produce the graphene suspension.

If an oxidizing agent is present in the impacting chamber, the graphene sheets produced contain oxidized graphene or graphene oxide sheets. If a chemical functionalizing agent is present in the impacting chamber, the graphene sheets produced contain functionalized graphene or graphene oxide sheets.

In some embodiments, a plurality of impacting balls or media are added to the impacting chamber of the energy impacting apparatus.

Mechanical shearing means includes, as examples, operating a disperser, homogenizer, high shear mixer, rotatory blade mixer, reverse-blade mixer, wet ball milling, etc. Such a shearing device is capable of inducing a local shear strain or stress at a shear rate of $10^{-3}$ sec$^{-1}$ or higher; preferably greater than $10^{-1}$ sec$^{-1}$, further preferably greater than $10^{+1}$ sec$^{-1}$, and most preferably greater than $10^{+3}$ sec$^{-1}$.

In some embodiments, step (a) comprises adding an oxidizing liquid in the mixture so that the oxidizing liquid acts to at least partially oxidize the graphene sheets during step (b). The oxidizing liquid may be selected from a liquid containing an oxidizer selected from $H_2O_2$, nitric acid, potassium permanganate, sodium permanganate, transition metal permanganate, sodium chlorate, potassium chlorate, or a combination thereof.

In some embodiments, the starting material (graphitic or carbonaceous material as a graphene source material) has never been previously intercalated or chemically oxidized. This starting material is not a graphite intercalation compound (GIC) or graphite oxide (GO). Preferably, the source graphitic material may be selected from natural graphite, synthetic graphite, highly oriented pyrolytic graphite, mesocarbon microbead, graphite fiber, graphitic nanofiber, graphite oxide, graphite fluoride, chemically modified graphite, exfoliated graphite, vein graphite, or a combination thereof.

In certain embodiments, the starting material has been previously fluorinated, chlorinated, brominated, iodized, nitrogenated, or hydrogenated and the graphene dispersion contains graphene fluoride, graphene chloride, graphene bromide, graphene iodide, nitrogenated graphene, or hydrogenated graphene.

In some embodiments, the impacting chamber of the energy impacting apparatus further contains a protective fluid; e.g. inert gas, non-reactive liquid, water, etc.

The invented method is essentially a two-step process, significantly reducing process costs. In less than 1-4 hours of process time, graphene sheets are peeled off from graphite particles, followed by a fast, efficient removal of the carrier material for producing graphene suspension. This process is stunningly short and simple.

A preferred embodiment of the present invention is a method of directly mixing a graphitic material and a carrier material into an energy impacting device, such as a ball mill, and submitting the mixture to a sufficiently long treatment time to peel off graphene layers from the source graphitic material and transfer these graphene layers immediately to tihe carrier material surfaces to produce graphene-coated solid carrier particles. These graphene layers are typically single-layer or few-layer graphene sheets (typically <5 layers, mostly single-layer graphene).

Following this step, the graphene-coated carrier particles were dispersed in a desired liquid medium and the method further comprises operating ultrasonication or mechanical shearing means to separate graphene sheets from the supporting carrier particles. The resulting suspension now contains both separated graphene sheets and solid carrier particles. The carrier particles may be removed by means of filtration, centrifugation, etc.

In certain embodiments, the graphene sheets supported on carrier particle surfaces may be exposed to an oxidizing medium before or during the separation procedure. A very small amount of an oxidizing agent is sufficient to accomplish the oxidation of the isolated graphene sheets or the graphene sheets supported on a solid carrier particle surface.

This is a surprisingly simple method. In contrast, prior researchers and manufacturers have focused on more complex, time intensive and costly methods to create graphene (including graphene oxide) and their dispersions in industrial quantities. The present invention has several unexpected attributes or advantages:

(1) Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of carrier material particles. No undesirable chemicals (e.g. sulfuric acid and nitric acid) are used in the production of isolated graphene sheets.

(2) Unlike conventional oxidation and intercalation methods (e.g. well-known Hummer's method) that always produce heavily oxidized graphene sheets (i.e. heavily damaged graphene oxide, having an oxygen content up to 47% by weight) in a non-controllable manner, initially pristine graphene sheets are produced by using the invented approach. These pristine graphene sheets can be concurrently and subsequently oxidized in a controlled manner to yield GO sheets of controllable and desirable oxygen contents from 5% to approximately 50% by weight. The GO sheets produced by conventional methods typically cannot recover their structure and properties even after thermal or chemical reduction of GO sheets. In contrast, the sheets being initially free of oxidation damage allow the creation of graphene containing products with higher electrical and thermal conductivity.

(3) The amount of sulfuric acid/oxidizer used for producing graphene oxide is typically only 1-10% of what would be required for GO production using conventional methods. Furthermore, more environmentally benign oxidizers (e.g. $H_2O_2$) can be readily and easily used, instead of undesirable chemicals such as strong sulfuric acids and nitric acid or potassium permanganate.

(4) Consequently, the required amounts of washing water, after production of pristine graphene or graphene oxide, are dramatically reduced. Furthermore, the amounts of $NO_x$ and $SO_x$ resulting from residual sulfuric acid and nitric acid of conventional methods are dramatically reduced or even totally eliminated.

The carrier material can be an organic, inorganic, metal, glass, metal oxide, metal carbide, metal nitride, metal boride, or ceramic material. Carrier materials can be in the form of pellets, filament, fibers, powder, reactor spheres, or other forms. Some examples of organic carrier materials include wax, soluble polymers, nut husks, and wood chips.

The energy impacting apparatus may be selected from a ball mill, vibratory ball mill, planetary ball mill, high energy mill, basket mill, agitator ball mill, continuous ball mill, stirred ball mill, pressurized ball mill, vacuum ball mill, freezer (SPEX) mill, vibratory sieve, ultrasonic homogenizer mill, resonant acoustic mixer, or shaker table.

The presently invented process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride with less than 5% fluorine by weight, graphene with a carbon content no less than 95% by weight, or functionalized graphene.

Another surprising and highly advantageous feature of the presently invented process is the notion that graphene sheet production and oxidation can be accomplished concurrently in the same impacting chamber provided an oxidizing agent is enclosed in the impacting chamber. The impact-induced kinetic energy experienced by the carrier particles are of sufficient energy and intensity to chemically activate the edges and surfaces of graphene sheets coated on carrier particle surfaces; e.g. creating highly active sites or free radicals). Desired oxygen-containing groups (e.g. —COOH, —OH, etc.) can be imparted to graphene edges and/or surfaces, provided that selected chemical species (oxidizing agents) containing desired chemical function groups.) are dispersed in the impacting chamber. Chemical oxidation reactions can occur in situ as soon as the reactive sites or active radicals are formed.

The present invented method may further contain a procedure of functionalizing the produced graphene oxide sheets. Such a chemical functionalization procedure may be conducted concurrently with production of graphene sheets if a desired chemical functionalizing agent is included in the mixture of the impacting chamber during step (a) or step (b). Chemical functionalization may be conducted after the graphene or graphene oxide sheets are produced.

In some embodiments, functionalizing agents contain a chemical functional group selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

Alternatively, the functionalizing agent contains an azide compound selected from the group consisting of 2-azido-ethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

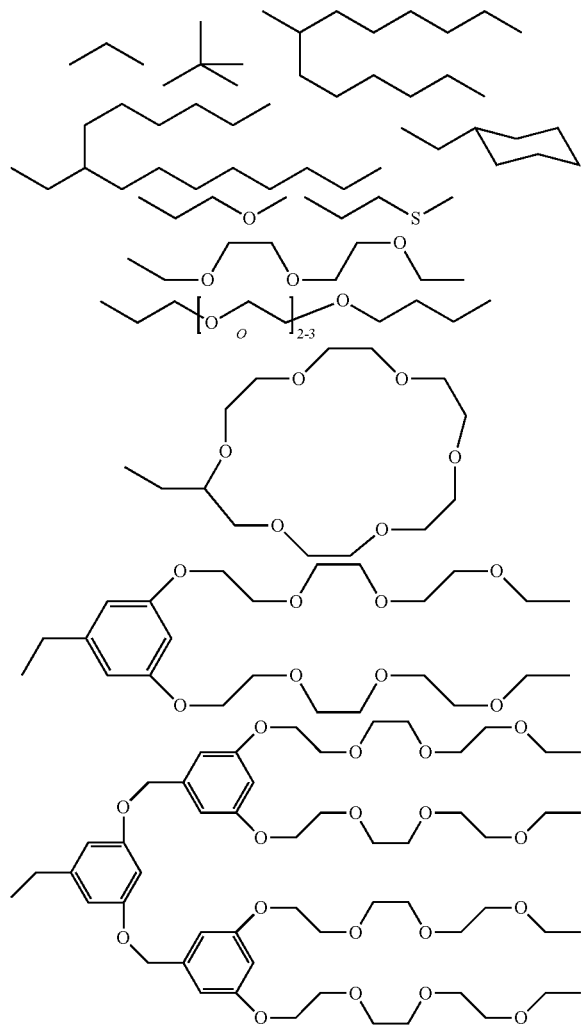

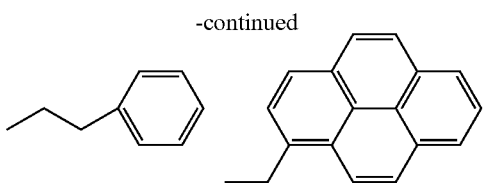

and combinations thereof.

In certain embodiments, the functionalizing agent contains an oxygenated group selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R'', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

The functionalizing agent may contain a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the functionalizing agent contains a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_yR'_{3-y}$, R'Si $(-O-SiR'_2-)OR'$, R'—R'', R'—N—CO, $(C_2H_4O-)_wH$, $(-C_3H_6O-)_wH$, $(-C_2H_4O)_w$—R', $(C_3H_6O)_w$—R', R', and w is an integer greater than one and less than 200.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nanofiber.

One preferred specific embodiment of the present invention is a method of producing oxidized versions of graphene sheets or nano graphene platelet (NGP) material. The NGP is essentially composed of a sheet of graphene plane (hexagonal lattice of carbon atoms) or multiple sheets of graphene plane stacked and bonded together (typically, on an average, less than five sheets per multi-layer platelet). Each graphene plane, also referred to as a graphene sheet or basal plane comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene with some few-layer graphene sheets (2-10 layers, but mostly <5 layers). The length and width of a NGP are typically between 200 nm and 20 μm, but could be longer or shorter, depending upon the sizes of source graphite material particles.

Figure 2:
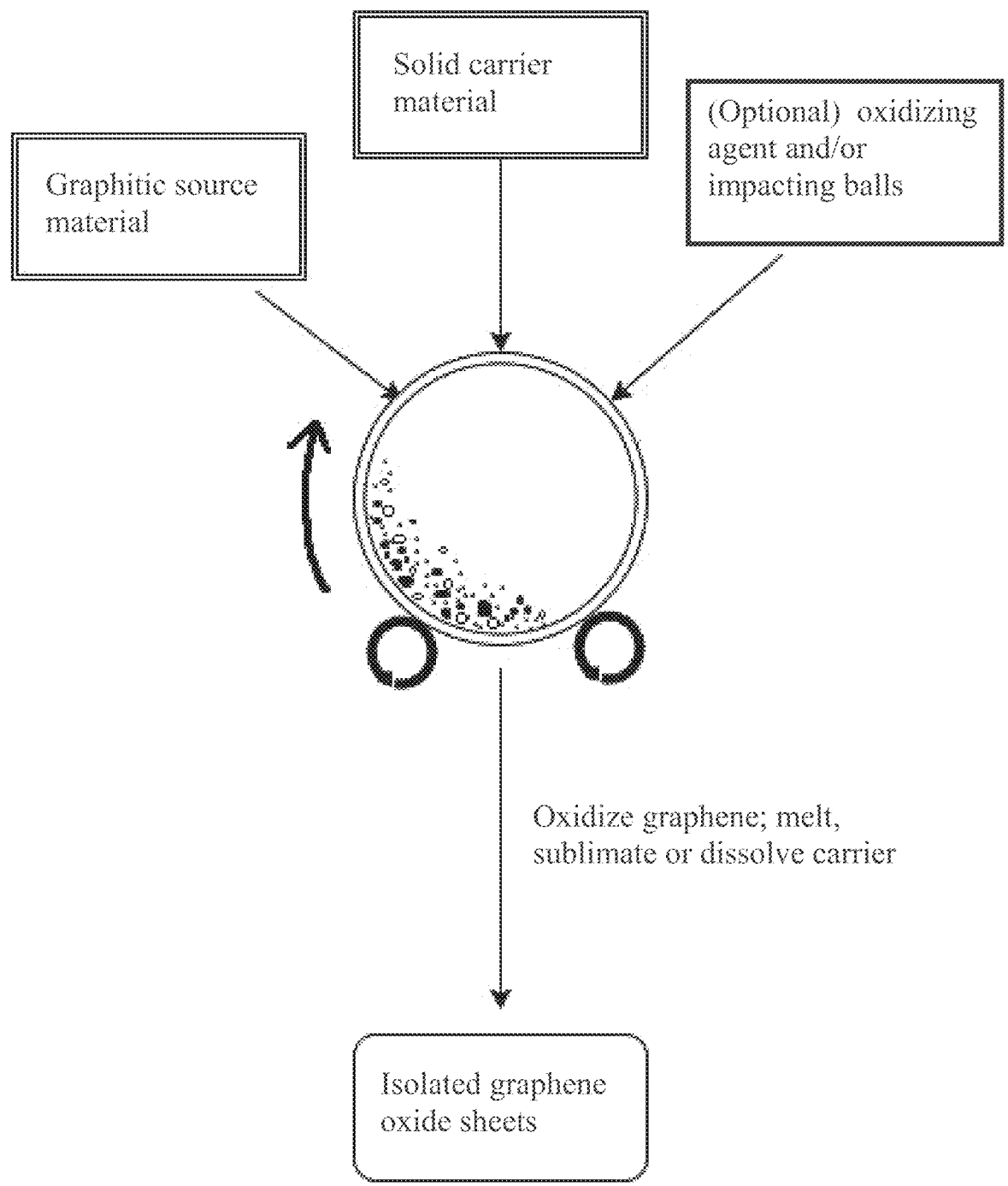
FIG. 2 A flow chart showing the presently invented two-step process for producing graphene suspensions.

The present invention provides a strikingly simple, fast, scalable, environmentally benign, and cost-effective process that avoids essentially all of the drawbacks associated with prior art processes. As schematically illustrated in FIG. 2, one preferred embodiment of this method entails placing source graphitic material particles, an optional oxidizing agent and/or chemical functionalization agent, and carrier material particles (plus optional impacting balls, if so desired) in an impacting chamber. After loading, the resulting mixture is immediately exposed to impacting energy, which is accomplished by rotating the chamber to enable the impacting of the carrier particles (and optional impacting balls) against graphite particles. These repeated impacting events (occurring in high frequencies and high intensity) act to peel off graphene sheets from the surfaces of graphitic material particles and directly transfer these graphene sheets to the surfaces of carrier particles. This is a "direct transfer" process.

If an oxidizing agent and/or chemical functionalization agent is present in the impacting chamber, oxidation and/or chemical functionalization of the produced graphene sheets also occurs substantially concurrently.

In certain embodiments, in the impacting chambers containing impacting balls (e.g. stainless steel or zirconia beads), graphene sheets are peeled off by the impacting balls and tentatively transferred to the surfaces of impacting balls first. When the graphene-coated impacting balls impinge upon the carrier material particles, the graphene sheets are transferred to surfaces of the carrier material particles. This is an "indirect transfer" process. Again, if an oxidizing agent and/or chemical functionalization agent is present in the impacting chamber, oxidation and/or chemical functionalization of the produced graphene sheets also occurs substantially concurrently.

In less than 1-4 hours, most of the constituent graphene sheets of source graphite particles are peeled off, forming mostly single-layer graphene and few-layer graphene (mostly less than 5 layers). Following the direct or indirect transfer process (coating of graphene sheets on carrier material particles), the graphene sheets can be separated from the carrier material particles and directly dispersed in a liquid medium if the graphene-coated carrier particles are dispersed in the liquid medium, which is submitted to ultrasonication or mechanical shearing.

Figure 1:
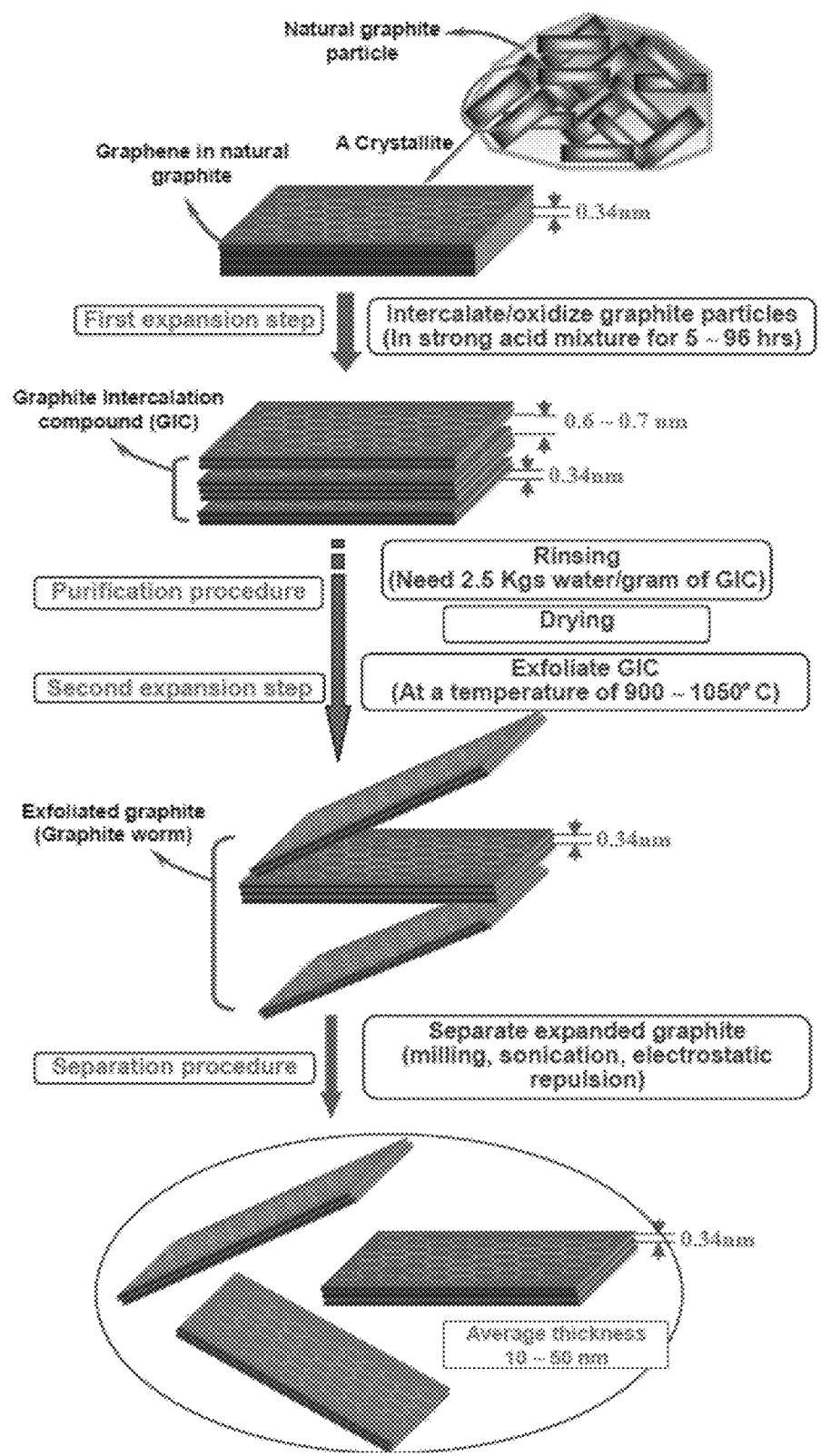
FIG. 1 A flow chart showing the most commonly used prior art process of producing highly oxidized NGPs that entails tedious chemical oxidation/intercalation, rinsing, and high-temperature exfoliation procedures.

In contrast, as shown in FIG. 1, the prior art chemical processes typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets) exhibit electrical conductivity values in the range of 1,500-4,500 S/cm. In contrast, the RGO paper prepared by the same paper-making procedure typically exhibits electrical conductivity values in the range of 100-1,000 S/cm.

It is again critically important to recognize that the impacting process not only avoids significant chemical usage, but also produces a higher quality final product—pristine graphene as opposes to thermally reduced graphene oxide, as produced by the prior art process. Pristine graphene enables the creation of GO materials in a controlled manner.

Although the mechanisms remain incompletely understood, this revolutionary process of the present invention appears to essentially eliminate the required functions of graphene plane expansion, intercalant penetration, exfoliation, and separation of graphene sheets and replace it with an entirely mechanical exfoliation process. The whole process can take less than 1-4 hours, and can be done with no added undesirable chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. This material may be selected from natural graphite, synthetic graphite, highly oriented pyrolytic graphite, mesocarbon microbead, graphite fiber, graphitic nanofiber, graphite oxide, graphite fluoride, chemically modified graphite, exfoliated graphite, or a combination thereof. By contrast, graphitic material for used for the prior art chemical formation and reduction of graphene oxide requires size reduction to 75 um or less average particle size. This process requires size reduction equipment (for example hammer mills or screening mills), energy input, and dust mitigation. By contrast, the energy impacting device method can accept almost any size of graphitic material. Starting material of mm or cm in size or larger has been successfully processed to create graphene. The only size limitation is the chamber capacity of the energy impacting device.

The presently invented process is capable of producing single-layer graphene or graphene oxide sheets dispersed in a liquid medium. In many examples, the graphene material produced contains at least 80% (can be higher than 90%) single-layer graphene oxide sheets.

The presently invented process does not involve the production of GIC and, hence, does not require the exfoliation of GIC at a high exfoliation temperature (e.g. 800-1, 100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

One preferred embodiment of the present invention is the inclusion of impacting balls or media to the impacting chamber, as illustrated in FIG. 2. The impact media may contain balls of metal, glass, ceramic, or organic materials. The size of the impacting media may be in the range of 1 mm to 20 mm, or it may be larger or smaller. The shape of the impacting media may be spherical, needle like, cylindrical, conical, pyramidal, rectilinear, or other shapes. A combination of shapes and sizes may be selected. The size distribution may be unimodal Gaussian, bimodal or tri-modal.

After direct transfer or indirect transfer of graphene sheets to carrier particle surfaces, the graphene-coated carrier particles may be dispersed in a desired liquid medium and the method further comprises operating ultrasonication or mechanical shearing means to separate graphene sheets from the supporting carrier particles. The resulting suspension now contains both separated graphene sheets and solid carrier particles. The carrier particles may be removed by means of filtration, centrifugation, etc.

One significant advantage of the present invention as compared to prior art is flexibility of selecting carrier materials. There are many opportunities to use pre-consumer or post-consumer waste material as the carrier, diverting this material from disposal by landfill or incineration. Nut shells, rice husks, shredded tires, and ground co-mingled recycled plastic are all possible cost-effective carrier materials for the production of graphene.

Figure 3:
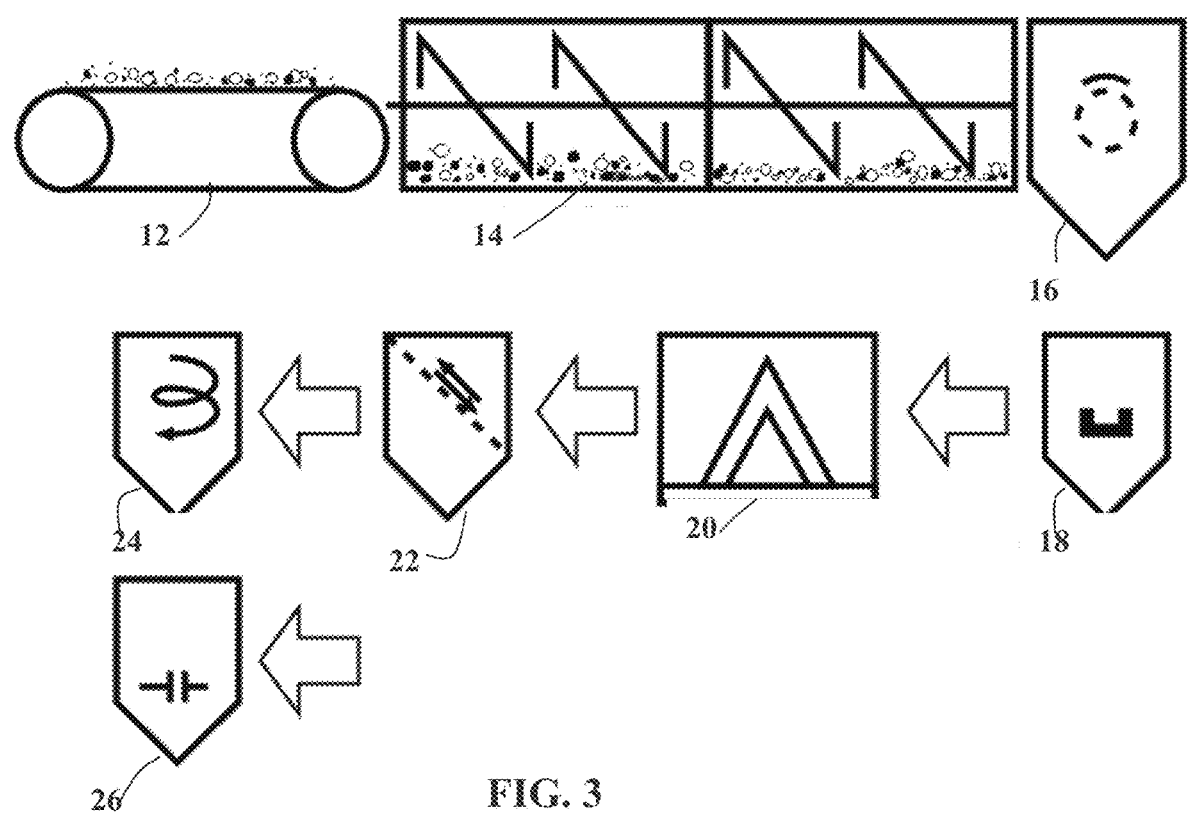
FIG. 3 A flow chart showing the presently invented process for producing isolated graphene sheets via a continuous ball mill.

In a desired embodiment, the presently invented method is carried out in an automated and/or continuous manner. For instance, as illustrated in FIG. 3, the mixture of graphite particles and solid carrier particles (plus optional impacting balls) is delivered by a conveyer belt 12 and fed into a continuous ball mill 14. After ball milling to form graphene-coated solid carrier particles, the product mixture (possibly also containing some residual graphite particles and optional impacting balls) is discharged from the ball mill apparatus 14 into a screening device (e.g. a rotary drum 16) to separate graphene-coated solid carrier particles from residual graphite particles (if any) and impacting balls (if any). This separation operation may be assisted by a magnetic separator 18 if the impacting balls are ferromagnetic (e.g. balls of Fe, Co. Ni, or Mn-based metal). The graphene-coated carrier particles may be delivered into a combustion chamber 20, if the solid carrier can be burned off (e.g. plastic beads, rubber particles, and wax particles, etc.). Alternatively, these particles can be discharged into a dissolving chamber for dissolving the carrier particles (e.g. plastic beads). The product mass can be further screened in another (optional) screening device 22, a powder classifier or cyclone 24, and/or an electrostatic separator 26. These procedures can be fully automated.

Figure 4A:
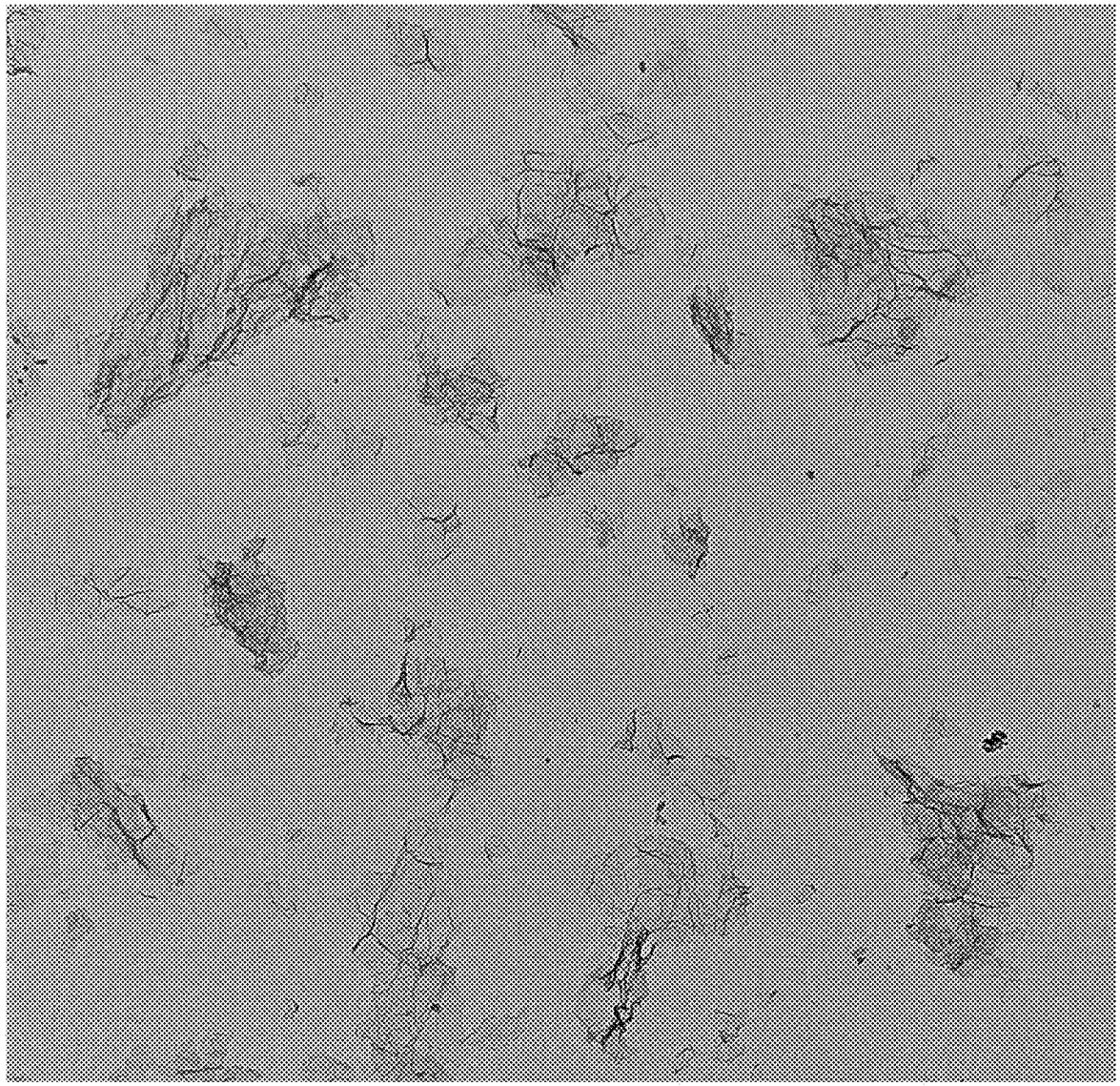
FIG. 4(A) Transmission electron micrograph of graphene sheets produced by conventional Hummer's route (much smaller graphene sheets, but comparable thickness).
Figure 4B:
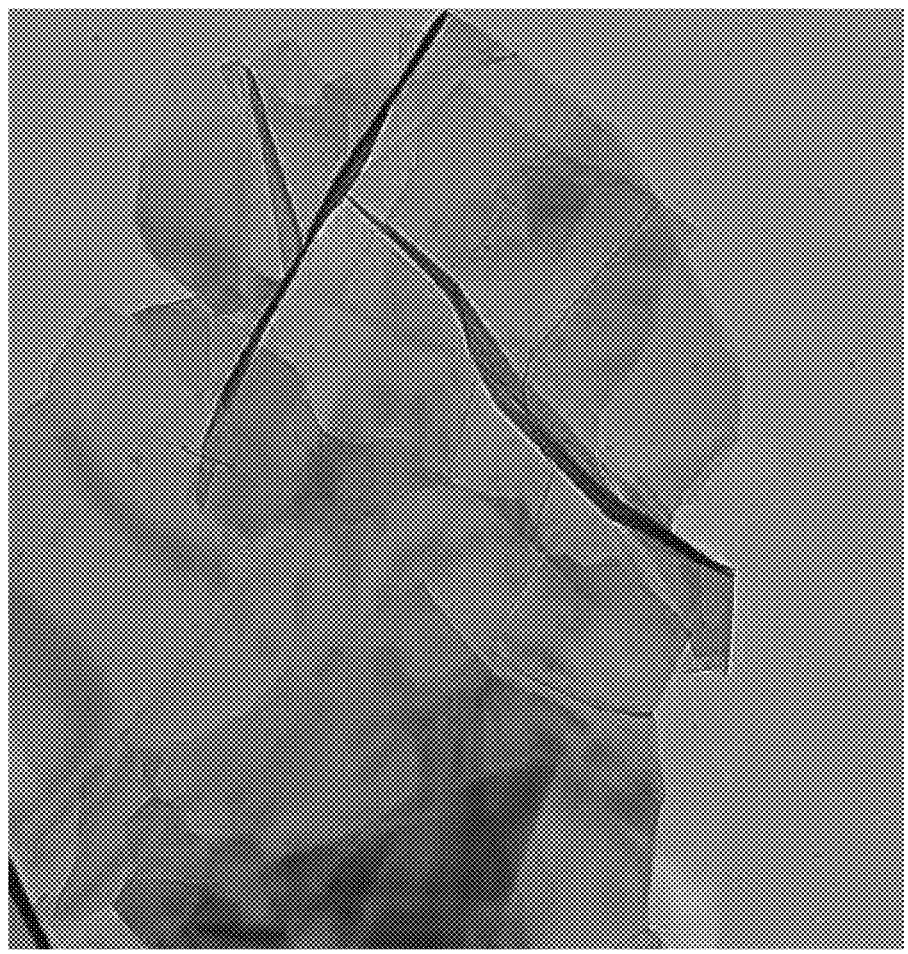
FIG. 4(B) Transmission electron micrograph of graphene sheets produced by the presently invented impact energy method.

FIG. 4(A) shows a transmission electron micrograph of graphene sheets produced by conventional Hummer's route (much smaller graphene sheets, but comparable thickness). FIG. 4(B) shows a transmission electron micrograph of graphene sheets produced by the presently invented impact energy method, which are larger in length and width.

Graphene sheets transferred to carrier solid particle surfaces, before or after separation, have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nano platelets produced through transfer to a solid carrier particle. The impact-induced kinetic energy experienced by the carrier particles are of sufficient energy and intensity to chemically activate the edges and even surfaces of graphene sheets coated on carrier particle surfaces (e.g. creating highly active sites or free radicals). These conditions enable ready oxidation and/or chemical functionalization of the graphene sheets (free-standing or being supported on a solid carrier surface) in the presence of an oxidizing agent/functionalization agent in the impacting chamber.

If certain chemical species containing desired chemical function groups (e.g. $-NH_2$, $Br-$, etc.) are added in the impacting chamber (preferably after oxidation of graphene occurs), these functional groups can be imparted to graphene edges and/or surfaces. In other words, production and chemical functionalization of graphene oxide sheets can be accomplished concurrently by including appropriate chemical compounds in the impacting chamber. In summary, a major advantage of the present invention over other processes is the simplicity of simultaneous production and modification of surface chemistry.

In one preferred group of chemical agents, the resulting functionalized NGP may broadly have the following formula(e): [NGP]—$R_m$, wherein m is the number of different functional group types (typically between 1 and 5), R is selected from $SO_3H$, $COOH$, $NH_2$, $OH$, $R'CHOH$, $CHO$, $CN$, $COCl$, halide, $COSH$, $SH$, $COOR'$, $SR'$, $SiR'_3$, $Si(-OR'-)_y R'_{3-y}$, $Si(-O-SiR'_2-)OR'$, $R"$, Li, $AlR'_2$, $Hg-X$, $TlZ_2$ and $Mg-X$, wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

For NGPs to be effective reinforcement fillers in epoxy resin, the function group $-NH_2$ is of particular interest. For example, a commonly used curing agent for epoxy resin is diethylenetriamine (DETA), which has three $-NH_2$ groups. If DETA is included in the impacting chamber, one of the three $-NH_2$ groups may be bonded to the edge or surface of a graphene sheet and the remaining two un-reacted $-NH_2$ groups will be available for reacting with epoxy resin later. Such an arrangement provides a good interfacial bonding between the NGP (graphene sheets) and the matrix resin of a composite material.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The above-described [NGP]—$R_m$ may be further functionalized. This can be conducted by opening up the lid of an impacting chamber after the $-R_m$ groups have been attached to graphene sheets and then adding the new functionalizing agents to the impacting chamber and resuming the impacting operation. The resulting graphene sheets or platelets include compositions of the formula: [NGP]-$A_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$(R')$_3$X$^-$, R'SiR'$_3$, R'Si(—OR'—)$_y$ R'$_{3-y}$, R'Si(—O—SiR'$_2$—)OR', R'—R", R'—N—CO, ($C_2H_4O$—)$_w$H, (—$C_3H_6O$—)$_w$H, (—$C_2H_4O$)$_w$—R', ($C_3H_6O$)$_w$—R', R', and w is an integer greater than one and less than 200.

The NGPs may also be functionalized to produce compositions having the formula: [NGP]—[R'-A]$_m$, where m, R' and A are as defined above. The compositions of the invention also include NGPs upon which certain cyclic compounds are adsorbed. These include compositions of matter of the formula: [NGP]—[X—$R_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-$A_a$]$_m$, where m, a, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1965), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The following examples serve to provide the best modes of practice for the present invention and should not be construed as limiting the scope of the invention:

Example 1: Suspensions Containing Isolated Graphene and Graphene Oxide Sheets from Flake Graphite Via Polypropylene Powder-Based Carrier In an experiment, 1 kg of polypropylene pellets, 50 grams of flake graphite, 50 mesh (average particle size 0.18 mm; Asbury Carbons, Asbury N.J.) and 250 grams of magnetic stainless steel pins (Raytech Industries. Middletown Conn.) were placed in a ball mill container. The ball mill was operated at 300 rpm for 4 hours. The container lid was removed and stainless steel pins were removed via a magnet. The polymer carrier material was found to be coated with a dark carbon layer. Carrier material was placed over a 50 mesh sieve and a small amount of unprocessed flake graphite was removed.

Subsequently, two separate procedures were conducted to produce suspensions containing pristine graphene sheets or graphene oxide sheets dispersed in a liquid medium. One procedure involved dispersing the coated carrier material in NMP and subjecting the suspension to mechanical shearing for obtaining a suspension containing isolated graphene sheets dispersed in NMP.

The other procedure entailed immersing graphene-coated PP particles in a hydrogen peroxide-water solution (30% $H_2O_2$ in water) and implementing an ultrasonication tip in the solution to concurrently oxidize and separate graphene sheets from the carrier particles for 15 minutes to 2 hours. The products were graphene oxide sheets, having an oxygen content from 5 to 35% by weight, dispersed in a water solution.

Although polypropylene (PP) is herein used as an example, the carrier material for making isolated graphene oxide sheets is not limited to PP or any polymer (thermoplastic, thermoset, rubber, etc.). The carrier material can be a glass, ceramic, metal, or other organic material, provided the carrier material is hard enough to peel off graphene sheets from the graphitic material (if the optional impacting balls are not present).

Example 2: Graphene Oxide from Expanded Graphite Via ABS Polymer

In an experiment, 100 grams of ABS pellets, as solid carrier material particles, were placed in a 16 oz plastic container along with 5 grains of natural graphite. This container was placed in an acoustic mixing unit (Resodyn Acoustic mixer), and processed for 30 minutes. After processing, carrier material was found to be coated with a thin layer of graphene.

Graphene-coated carrier particles were then immersed in a mixture of sulfuric acid and potassium permanganate (graphene/sulfuric acid/potassium permanganate ratio of 1.0/1.0/0.5) and subjected to ultrasound energy to speed oxidation of graphene and separation of resulting GO sheets from the ABS particles. The solution was filtered using an appropriate filter and washed with distilled water. Subsequent to washing, filtrate was dried in a vacuum oven set at 60° C. for 2 hours.

It may be noted that the conventional Hummer's method typically requires the use of 24 mL (44 grams) of sulfuric acid and 5 grams of potassium permanganate to oxidize 1 grain of natural graphite. The required ratio was 1.0/44/5; i.e. significantly higher amounts of chemicals were used. Additionally, 15-30% of the natural graphite was "eaten away" during the GO production process using the Hummer's method.

Example 3: Functionalized Graphene from Mesocarbon Microbeads (MCMBs) Via PLA In one example, 100 grams of PLA pellets (carrier material), 2 grams of MCMBs (China Steel Chemical Co., Taiwan), and 2 grams of carboxylic acid (an oxidizing agent) were placed in a vibratory ball mill, which also contains particles of magnetic stainless steel impactor and processed for 1 hour to obtain graphene oxide-coated PLA particles. Subsequently. DETA was added and the material mixture was processed for an additional 1 hour. The vibratory mill was then opened and the carrier material was found to be coated with a brown-color coating of graphene oxide. The magnetic steel particles were removed with a magnet. The graphene oxide-coated carrier material particles were rinsed with isopropyl alcohol and then water. The slurry containing graphene-coated PLA particles was subjected to mechanical shearing using a rotary-blade mixer for 0.5 hours to separate GO sheets from PLA particles. Then, PLA particles were removed via centrifugation. The remaining suspension contained GO dispersed in water.

In separate experiments, the following functional group-containing species were introduced to the graphene oxide sheets produced: an amino acid, sulfonate group ($-SO_3H$), 2-azidoethanol, polyamide (caprolactam), and aldehydic group. In general, these functional groups were found to impart significantly improved interfacial bonding between resulting graphene oxide sheets and epoxy, polyester, polyimide, and vinyl ester matrix materials to make stronger polymer matrix composites. The interfacial bonding strength was semi-quantitatively determined by using a combination of short beam shear test and fracture surface examination via scanning electronic microscopy (SEM). Non-functionalized graphene sheets tend to protrude out of the fractured surface without any residual matrix resin being attached to graphene sheet surfaces. In contrast, the fractured surface of composite samples containing functionalized graphene oxide sheets do not exhibit any bare graphene sheets; any what appears to be graphene sheets were completely embedded in a resin matrix.

Example 4. Graphene Oxide from Highly Oriented Pyrolytic Graphite (HOPG) Via Glass Beads and SPEX Mill In an experiment, 5 grams of glass beads were placed in a SPEX mill sample holder (SPEX Sample Prep, Metuchen, N.J.) along with 0.25 grams of HOPG derived from graphitized polyimide. The SPEX mill was operated for 10 minutes. After operation, the contents of the sample holder were transferred to a water bath and subjected to ultrasonication, which helped to separate graphene sheets from glass bead surfaces. The glass bead particles were then manually removed from the suspension and, creating a water suspension of graphene. This suspension was determined to be a mixture of single layer graphene (86%) and few layer graphene dispersed in water. The sample was divided into two parts. In one part, hydrogen peroxide-water solution was added into the suspension to obtain a concentration of 30% $H_2O_2$ in water and the graphene sheets were oxidized for 1 hour to produce graphene oxide suspension.

Example 5: Metal Particles as the Carrier Material

In one example, 100 grams of tin (45 micron, 99.9% purity, Goodfellow Inc.; Coraopolis, Pa.) was mixed with 10 grams of vein graphite (40 mesh size, Asbury Carbons, Asbury N.J.) and loaded into a vibratory mill. The material was processed for 2 hours, and the vibratory mill was opened. The tin powder was found to be coated with few-layer graphene sheets. These pellets were removed from the mill and poured into a hydrogen peroxide-water solution (30% $H_2O_2$ in water), subjected to ultrasonication. Tin particles were easily removed from the suspension that contains pristine graphene sheets dispersed in the water solution. A small amount of the produced suspension was subjected to filtration using a Teflon membrane as a filter. The specific surface area of the resulting graphene oxide sheets was measured via nitrogen adsorption BET. The specific surface area was found to be approximately 540 $m^2/g$, indicating that the material was mostly few-layer graphene. A similar procedure was conducted using zinc particles as the solid carrier material.

Example 6: Graphene and Graphene Oxide from Natural Graphite Particles Via Polyethylene (PE) Beads and Ceramic Impacting Balls In an experiment, 0.5 kg of PE beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material was found to be coated with a dark carbon layer. Carrier material was placed over a 50 mesh sieve and a small amount of unprocessed flake graphite was removed. A coated carrier material sample was then dispersed into an organic solvent, DMF. The suspension was then subjected to ultrasonication for 0.5 hours to separate graphene sheets from PE particles. The PE particles were removed via centrifugation, resulting in a graphene suspension. A small sample of the suspension was removed and dried to obtain isolated graphene sheets (>95% single-layer graphene).

The invention claimed is:

1. A method of producing a graphene suspension comprising isolated graphene sheets dispersed in a liquid medium, said method comprising: (a) mixing multiple particles of a graphitic material and multiple particles of a solid carrier material to form a mixture in an impacting chamber of an energy impacting apparatus; (b) operating said energy impacting apparatus with a frequency and an intensity for a length of time sufficient for peeling off graphene sheets from said graphitic material and transferring said graphene sheets to surfaces of said solid carrier material particles to produce graphene-coated solid carrier particles inside said impacting chamber; and (c) dispersing said graphene-coated solid carrier particles in said liquid medium in a solvent and separating said graphene sheets from said solid carrier material particles using mechanical shearing means and removing said solid carrier material from said liquid medium to produce said graphene suspension, wherein said mechanical shearing means comprises operating a rotatory blade mixer or reverse-blade mixer.

2. The method of claim 1, wherein said step (a) further comprises adding an oxidizing liquid in said mixture so that said oxidizing liquid acts to partially oxidize said graphene sheets to produce graphene oxide during step (b).

3. The method of claim 2, wherein said oxidizing liquid is selected from a liquid containing an oxidizer selected from $H_2O_2$, nitric acid, potassium permanganate, sodium permanganate, transition metal permanganate, sodium chlorate, potassium chlorate, or a combination thereof.

4. The method of claim 1, wherein said step (c) comprises exposing said graphene sheets to an oxidizing medium, before, during or after the graphene sheets are separated from said solid carrier material particle surfaces, wherein said oxidizing medium is selected from an oxidizing gas or vapor, an oxidizing plasma, or an oxidizing liquid.

5. The method of claim 1, wherein said solid carrier material is selected from solid particles of an organic, polymeric, metal, glass, ceramic, or inorganic material.

6. The method of claim 1, wherein said solid carrier material includes plastic beads, plastic pellets, wax pellets, polymer powder or polymer reactor spheres, glass beads or fibers, metal particles or wires, metal oxide particles, ceramic particles, or a combination thereof.

7. The method of claim 1, wherein said step (c) comprises oxidizing said graphene sheets on said solid carrier material particle surfaces in an oxidizing liquid medium while being submitted to ultrasonication or mechanical shearing.

8. The method of claim 1 wherein said graphitic material is selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof.

9. The method of claim 1, wherein the energy impacting apparatus is a vibratory ball mill, planetary ball mill, high energy mill, basket mill, agitator ball mill, continuous ball mill, stirred ball mill, pressurized ball mill, freezer mill, vibratory sieve, ultrasonic homogenizer mill, or resonant acoustic mixer.

10. The method of claim 1, wherein said graphitic material contains a non-intercalated and non-oxidized graphitic material that has never been previously exposed to a chemical or oxidation treatment prior to said mixing step.

11. The method of claim 1, wherein said graphitic material contains previously fluorinated, chlorinated, brominated, iodized, nitrogenated, or hydrogenated graphite or carbon material and the graphene suspension contains graphene fluoride, graphene chloride, graphene bromide, graphene iodide, nitrogenated graphene, or hydrogenated graphene.

12. The method of claim 1 wherein said graphene sheets contain single-layer graphene oxide sheets.

13. The method of claim 1 wherein said graphene sheets contain at least 80% single-layer graphene oxide or at least 80% few-layer graphene having no greater than 10 graphene planes.

14. The method of claim 1, wherein said step (a) further comprises adding a chemical functionalizing agent to said mixture to functionalize said graphene sheets.

15. The method of claim 14 wherein said functionalizing agent contains a chemical functional group selected from alkyl or aryl silane, alkyl or aralkyl group, hydroxyl group, carboxyl group, amine group, sulfonate group (—SO₃H), aldehydic group, quinoidal, fluorocarbon, or a combination thereof.

16. The method of claim 14, wherein said functionalizing agent contains a chemical functional group, wherein said chemical functional group is selected from the group consisting of 2-azidoethanol, 3-azidopropan-1-amine, 4-(2-azidoethoxy) -4-oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R = any one of the following groups,

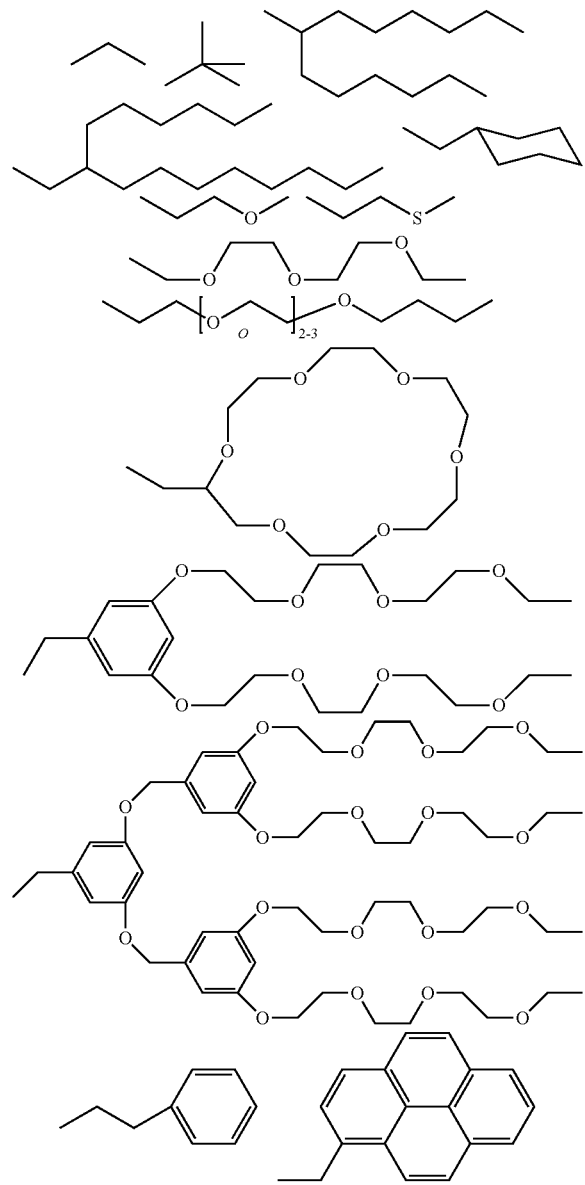

and combinations thereof.

17. The method of claim 14, wherein said functionalizing agent contains an oxygenated group selected from the group consisting of hydroxyl, peroxide, ether, keto, and aldehyde.

18. The method of claim 14, wherein said functionalizing agent contains a functional group selected from the group consisting of SO₃H, COOH, NH₂, OH, R'CHOH, CHO, CN, COCl, halide, COSH, SH, COOR', SR', SiR'₃, Si(—OR'—)$_y$R'$_{3-y}$, Si(—O—SiR'₂—)OR', R", Li, AlR'₂, Hg—X, TIZ₂ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

19. The method of claim 14, wherein said functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

20. The method of claim 14, wherein said functionalizing agent contains a functional group selected from OY, NHY, O=C—OY, P=C—NR'Y, O=C—SY, O=C—Y, —CR'1OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'₂, R'SH, R'CHO, R'CN, R'X, R'N⁺(R')₃X⁻, R'SiR'₃, R'Si(—OR'—)$_y$R'$_{3-y}$, R'Si(—O—SiR'₂—)OR', R'—R", R'—N—CO, (C₂H₄O—)$_w$H, (—C₃H₆O—)$_w$H, (—C₂H₄O)$_w$—R', (C₃H₆O)$_w$—R', R', and w is an integer greater than one and less than 200.

21. The method of claim 1, wherein said procedure of operating said energy impacting apparatus is conducted in a continuous manner using a continuous energy impacting device.

22. A method of producing a graphene suspension comprising isolated graphene sheets dispersed in a liquid medium, said method comprising: (a) mixing multiple particles of a graphitic material and multiple particles of a solid carrier material to form a mixture in an impacting chamber of an energy impacting apparatus; (b) operating said energy impacting apparatus with a frequency and an intensity for a length of time sufficient for peeling off graphene sheets from said graphitic material and transferring said graphene sheets to surfaces of said solid carrier material particles to produce graphene-coated solid carrier particles inside said impacting chamber; and (c) dispersing said graphene-coated solid carrier particles in said liquid medium and separating said graphene sheets from said solid carrier material particles using mechanical shearing means and removing said solid carrier material from said liquid medium to produce said graphene suspension, wherein said mechanical shearing means comprises operating a rotatory blade mixer or reverse-blade mixer, wherein step (a) further comprises adding a plurality of impacting balls or media to the impacting chamber of said energy impacting apparatus and said step (c) further comprises removing said impacting balls or media from said liquid medium.

* * * * *